United States Patent [19]

Blaise et al.

[11] 4,384,092

[45] May 17, 1983

[54] PROCESS FOR THE MANUFACTURE OF POLYTETRAFLUOROETHYLENE

[75] Inventors: Jean Blaise, Lyons; Jean-Louis Herisson, Brignais, both of France

[73] Assignee: Produits Chimiques Ugine Kuhlmann, Courbevoie, France

[21] Appl. No.: 257,243

[22] Filed: Apr. 24, 1981

[30] Foreign Application Priority Data

May 14, 1980 [FR] France ............................ 80 10793

[51] Int. Cl.³ ...................... C08F 2/00; C08F 14/18
[52] U.S. Cl. ................................ 526/225; 524/546; 526/255; 528/488; 528/489; 528/490
[58] Field of Search ............... 526/225, 255; 528/488, 528/489, 490

[56] References Cited

U.S. PATENT DOCUMENTS

| | | | |
|---|---|---|---|
| 2,559,751 | 7/1951 | Berry et al. | 526/255 |
| 3,345,317 | 10/1967 | Hoashi | 526/255 |
| 3,419,900 | 12/1968 | Elmore et al. | 526/255 |
| 4,025,709 | 5/1977 | Blaise et al. | 526/255 |

*Primary Examiner*—Harry Wong, Jr.
*Attorney, Agent, or Firm*—Sigalos & Levine

[57] ABSTRACT

A treatment procedure for aqueous colloidal polytetrafluoroethylene dispersions obtained by polymerization of tetrafluoroethylene in the presence of the lithium salt of a perfluoroalkanesulfonic acid as the emulsifier, characterized by the fact that a basic hydroxide or a soluble ammonium, alkali metal or alkaline-earth salt, with the exception of lithium hydroxide or a lithium salt, is added to the dispersion.

5 Claims, No Drawings

PROCESS FOR THE MANUFACTURE OF POLYTETRAFLUOROETHYLENE

BACKGROUND OF THE INVENTION

The present invention concerns a process for making aqueous colloidal polytetrafluoroethylene (PTFE) dispersions, obtained by emulsion polymerization of tetrafluoroethylene in the presence of the lithium salt of a perfluoroalkanesulfonic acid as the emulsifying agent, to give the products made from the PTFE the desired qualities According to known processes, aqueous colloidal dispersions of PTFE are prepared in a pressure-resistant autoclave by placing the gaseous monomer, or a mixture of monomers in the case of the preparation of copolymers, in contact with an aqueous solution containing an initiator capable of forming free radicals at the polymerization temperature, possibly a buffer for keeping the medium at a given pH, and an emulsifier which generally is an alkaline salt or ammonium salt of a carboxylic or sulfonic acid whose carbon chain possesses only fluorine atoms and possibly chlorine atoms. The polymerization is initiated by free radicals originating from the decomposition of a water-soluble peroxide such as succinyl peroxide or of an alkaline persulfate or ammonium persulfate. The persulfate is used alone if the polymerization temperature is above approximately 50° C., or in association with a reducing agent such as ferrous salt, silver nitrate, sodium bisulfite in the contrary case. The pH can be kept alkaline by a buffer, such as an alkaline or ammonium phosphate, pyrophosphate, or borate.

The polymerization temperature generally is between 5° C. and 100° C., and the pressure between 1 and 100 bars, preferably between 10 and 25 bars.

The qualities of the finished products manufactured from PTFE powder such as, for instance, tubing, wire coating, rods, strips (tapes), depend on the method used for the production of the aqueous colloidal PTFE dispersion. In particular, the nature of the ingredients used in polymerization can have an effect on the quality of the finished products, above all if for reasons of productivity one does not want to wash the powder after coagulation of the dispersion. The emulsifier is among the ingredients which can have an effect on the quality of the finished products; the two most often used types of emulsifiers for the polymerization of tetrafluoroethylene are either the salts of perfluorated carboxylic acids or the salts of perfluorated sulfonic acids. The salts of carboxylic acids having a number of carbon atoms below 10 are products which are soluble in water, thus easy to employ, and they decompose thermally, below 300° C., below the point of fusion (melting point) of the PTFE, without leaving traces. The salts of sulfonic acids having a number of carbon atoms from $C_6$ to $C_{16}$ are products which generally are very slightly soluble in water at a temperature below 80°–100° C., with the exception of the lithium salt.

The most often used emulsifiers are fluorinated or chlorofluorinated salts, in particular sodium or ammonium salts of a perfluoromonocarboxylic acid having 6 to 10 carbon atoms, such as ammonium perfluoroctanoate. They are introduced in aqueous solution, either totally at the start of polymerization, or progressively during the course of polymerization, as it is described in French Pat. No. 1,550,055. Although these emulsifiers give good results, they present the disadvantage of being costly and difficult to prepare. That is the reason why salts of sulfonic acids and, more particularly, salts of perfluoroalkanesulfonic acids are often substituted for them. These salts of sulfonic acids, on the other hand, are difficult to use because of their poor solubility in aqueous medium, with the exception of the lithium salt.

It has thus been considered to use, as the emulsifier, the lithium salt of perfluoroalkanesulfonic acids and, more particularly, salts of the formula $LiCF_3(CF_2)_nSO_3$, with "n" being a whole number between 5 and 16. It was, however, not possible to usefully employ these products since, being unstable at a temperature as low as 350° C., they become degraded, leaving black traces in the PTFE.

SUMMARY OF THE INVENTION

The present invention makes it possible to render the use of these lithium salts advantageous as emulsifiers in the polymerisation of tetrafluoroethylene by preserving the whiteness of the PTFE after coagulation of the treated dispersion.

Briefly, the present invention is directed to improvement in the process of treating an aqueous colloidal polytetrafluoroethylene in the presence of a lithium salt of a perfluoroalkanesulfonic acid as the emulsifier, the improvement comprising adding an electrolyte to the dispersion.

DETAILED DESCRIPTION

The electrolyte used must be either a basic hydroxide or a soluble ammonium, alkali metal or alkaline-earth salt, save for lithium hydroxide or a lithium salt.

The basic hydroxide can be any soluble hydroxide with the alkali metal hydroxides being most suitable.

As to the salts, the anion of the salt is absolutely without influence on the action of the latter in the procedure as long as the salt is soluble in the aqueous medium. As a result, any anion associated with ammonium or an alkali or alkaline-earth metal such that a salt which is soluble in aqueous medium is obtained, is suitable for the object of the invention.

The best results are obtained preferably with sodium and potassium hydroxides, potassium carbonate, sodium nitrate or sodium oxalate.

The quantity of hydroxide or of soluble salt must be sufficient to displace the cation of the emulsifier entirely. In principle, a stoichiometrical quantity in relation to the quantity of emulsifier is sufficient, although a slight excess of electrolyte can be recommended. Customarily, less than 1% by weight of electrolyte in relation to the weight of PTFE of the colloidal dispersion yields a satisfactory result.

The electrolyte, which has preferably been placed in solution in water previously, is mixed at ambient temperature into the aqueous colloidal dispersion of PTFE obtained according to conventional polymerization processes such as described, for instance, in French Pat. Nos. 1,550,055, 1,019,304, and 1,144,633, and a British Patent No. 1,545,675, utilizing $LiCF_3(CF_2)_nSO_3$ as the emulsifier, with "n" being a whole number from 5 to 16. After this treatment, the dispersion is coagulated mechanically according to customary procedures. The PTFE powder is drained, as by the use of centrifugation or vacuum filtration and then dried at 160° C.

The invention will be further described in connection with the examples which follow which are set forth for purposes of further illustration only.

In these examples, in order to examine the effect of the procedure on some finished objects, the PTFE powder having been obtained was treated under the conditions which follow:

The powder is mixed with 18% by weight either of E gasoline or of kerosene. After agitation for 30 minutes by rolling in a flask, the mixture is conditioned at 25° C. for at least four hours. The lubricated mixture is then poured into a mold and is brought into the preform state by increasing the pressure to a value of 2.0 MN/m$^2$ in 5 minutes. The pressure is then kept at 2.0 MN/m$^2$ for another 5 minutes. The preform is then extruded at 30° C. by using a hydraulic extruder through a die of 10 mm diameter having a center punch of 8 mm diameter. The reduction rate or ratio, that is to say the ratio between the surface of the cross section of the cylinder enclosing the piston and the surface of the cross section of the die is approximately 90:1. The pressure required to extrude the polymer under these conditions is measured by means of a pressure transducer. On coming out of the extruder, the "8×10" tube is continuously dried and continuously fritted at temperatures of about 410° C. for periods of several minutes. Extrusion can likewise be carried out through a rectangular die without punch; the "cane" which is obtained is calendered in order to obtain a strip which is then dried, then wound up on itself under tension until a certain thickness of rolled-up tape is obtained, and then fritted for several minutes at 380°–410° C.

EXAMPLE 1

An aqueous colloidal dispersion is obtained by polymerization of the $C_2F_4$ at 15° C. in a stainless steel autoclave of 170-liter capacity equipped with an agitation device. The autoclave is loaded with 100 liters of demineralized water, 5 g. of potassium persulfate, 7.5 g. of Mohr's salt (ferrous ammonium sulfate), 400 g. of dipotassium phosphate, 5 liters of paraffin oil, and 50 g. of $LiC_8F_{17}SO_3$. After degassing, enough $C_2F_4$ is introduced into the autoclave until a relative pressure of 21.6 bars is reached. Agitation is started up and polymerication starts instantaneously, resulting in a pressure drop in the autoclave. When the pressure drops to 19.6 bars, more $C_2F_4$ is added until 21.6 bars are reached again and so on repeatedly until a dispersion is obtained, whose polytetrafluoroethylene concentration reaches 25 to 30% by weight. During the course of polymerization, some $LiC_8F_{17}SO_3$ emulsifier is readded several times until a final concentration of 0.244% based on the water is reached.

This dispersion is divided into several parts, one remaining untreated as the reference control, while the others are respectively treated with an aqueous solution of $K_2CO_3$, NaOH, KOH, $NaNO_3$, or $Na_2(COO)_2$ added with slight agitation. After homogenization, the different sample portions are coagulated, drained (as by centrifugation or vacuum filtration) and dried for 15 hours at 160° C.

Tubing and tape were formed, as previously described, and after fritting for about 3 minutes at 410° C. for the tubing, and for 30 minutes at 380° C. for the rolled-up tape, the finished products have the appearance listed in the Table I which follows:

TABLE I

| Electrolyte | % by weight of electrolyte in relation to the weight of PTFE | Appearance of the finished product | |
|---|---|---|---|
| | | 8 × 10 pipe | rolled-up tape |
| $K_2CO_3$ | 0.4 | white | white very few bubbles |
| NaOH | 1 | white | white very few bubbles |
| KOH | 1 | white | white very few bubbles |
| $NaNO_3$ | 0.4 | white | white very few bubbles |
| $Na_2(COO)_2$ | 0.4 | white | white very few bubbles |
| Control | 0 | slightly grey black specks | grey numerous bubbles |

EXAMPLE 2

Dispersions prepared according to Example 1 are treated under the same conditions with NaCl, KCl, $BaCl_2$, $CaCl_2$, $MgCl_2$ and barium acetate, with one dispersion sample portion being preserved as reference control.

The products extruded in the form of tubing are fritted at 410° C. for at least 6 minutes, and those extruded and rolled up in the form of rolled-up tape are fritted at 380° C. for at least 60 minutes. The products obtained after fritting have the appearance shown in the Table II which follows:

TABLE II

| Electrolyte | % by weight of electrolyte in relation to the weight of PTFE | Appearance of the finished product | |
|---|---|---|---|
| | | 8 × 10 pipe | rolled-up tape |
| NaCl | 0.4 | white | white few bubbles |
| KCl | 0.4 | white | white few bubbles |
| $BaCl_2$ | 0.4 | white | white few bubbles |
| $CaCl_2$ | 0.4 | white | white few bubbles |
| $MgCl_2$ | 0.4 | white | white few bubbles |
| $Ba(CH_3CO_2)_2$ | 0.4 | white | white few bubbles |
| Control | 0 | slightly grey black specks | grey black specks bubbles |

EXAMPLE 3

A dispersion is prepared according to Example 1, but with a $LiC_7F_{15}SO_3$ emulsifier instead of $LiC_8F_{17}SO_3$. This dispersion is divided into several portions treated according to Example 1. The appearance of the finished products, obtained likewise under the conditions of Example 1, is listed in the Table III which follows:

TABLE III

| Electrolyte | % by weight of electrolyte in relation to the weight of PTFE | Appearance of the finished product | |
|---|---|---|---|
| | | 8 × 10 pipe | rolled-up tape |
| $K_2CO_3$ | 0.4 | white | white |

TABLE III-continued

| Electrolyte | % by weight of electrolyte in relation to the weight of PTFE | Appearance of the finished product | |
|---|---|---|---|
| | | 8 × 10 pipe | rolled-up tape |
| NaOH | 1.0 | white | homogeneous white |
| KOH | 1.0 | white | homogeneous white |
| NaNO$_3$ | 0.4 | white | homogeneous white |
| Na$_2$(COO)$_2$ | 0.4 | white | homogeneous white |
| Control | 0 | grey black specks | grey numerous bubbles |

EXAMPLE 4

A dispersion is prepared according to Example 1, but with an emulsifier of the type LiR$_F$SO$_3$ in which R$_F$ is a mixture by weight of C$_6$F$_{13}$: 51%, C$_8$F$_{17}$: 26%, C$_{10}$F$_{21}$: 13%, C$_{12}$F$_{25}$: 6%, C$_{14}$F$_{29}$: 3%, and C$_{16}$F$_{33}$: 1%. This dispersion is divided into several portions and the tests are carried out under the conditions of Example 1.

The results obtained are identical to those of Example 1.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. In the method of making polytetrafluoroethylene by polymerization of tetrafluoroethylene in the presence of a lithium salt of a perfluoroalkanesulfonic acid as the emulsifier to form an aqueous colloidal dispersion of the polymer, the improvement comprising adding to the dispersion after the polymerization is completed an electrolyte in an amount sufficient to displace the cation of the emulsifier entirely selected from a basic hydroxide or a soluble ammonium, alkali metal, or alkaline earth salt, other than lithium hydroxide or a lithium salt.

2. The method of claim 1 wherein the basic hydroxide is an alkali metal hydroxide.

3. The method of claims 1 or 2 wherein the electrolyte is added to the dispersion prior to coagulation of the dispersion.

4. The method of claims 1 or 2 wherein the electrolyte is added in an amount sufficient at least stoichiometrically equivalent to the amount of emulsifier.

5. The method of claims 1 and 2 wherein the alkali metal hydroxide is sodium hydroxide or potassium hydroxide.

* * * * *